United States Patent
Kim et al.

(10) Patent No.: US 7,659,821 B2
(45) Date of Patent: Feb. 9, 2010

(54) SMART RADIO-FREQUENCY IDENTIFICATION (RFID) INFRASTRUCTURE AND METHOD

(75) Inventors: Moon J. Kim, Wappingers Falls, NY (US); Eric C. Yee, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 11/531,723

(22) Filed: Sep. 14, 2006

(65) Prior Publication Data

US 2008/0079578 A1  Apr. 3, 2008

(51) Int. Cl.
*G08B 13/14* (2006.01)
(52) U.S. Cl. .............. 340/572.1; 340/572.4; 340/572.7; 340/568.1; 340/539.12; 340/539.26; 700/214; 700/215; 700/225; 235/385; 235/492
(58) Field of Classification Search .............. 340/572.1, 340/572.4, 572.7, 568, 539.12, 539.26; 700/214, 700/215, 225; 235/385, 492
See application file for complete search history.

(56) References Cited

U.S. PATENT DOCUMENTS

| | | | |
|---|---|---|---|
| 3,828,306 A | | 8/1974 | Angeloni |
| 5,389,935 A | | 2/1995 | Drouault et al. |
| 5,504,717 A | | 4/1996 | Sharkey et al. |
| 5,565,858 A | * | 10/1996 | Guthrie ............... 340/10.33 |
| 5,774,876 A | * | 6/1998 | Woolley et al. ............... 705/28 |
| 5,804,810 A | * | 9/1998 | Woolley et al. ............. 235/492 |
| 6,155,292 A | | 12/2000 | Kurata |
| 6,169,476 B1 | | 1/2001 | Flanagan |
| 6,293,861 B1 | | 9/2001 | Berry |
| 6,614,351 B2 | | 9/2003 | Mann et al. |
| 6,661,635 B1 | | 12/2003 | Meid |
| 6,684,137 B2 | | 1/2004 | Takagi et al. |
| 6,693,511 B1 | | 2/2004 | Seal |
| 6,888,459 B2 | | 5/2005 | Stilp |
| 6,934,540 B2 | * | 8/2005 | Twitchell, Jr. ............ 455/422.1 |
| 7,019,639 B2 | | 3/2006 | Stilp |
| 7,081,818 B2 | | 7/2006 | Eckstein et al. |
| 7,089,099 B2 | | 8/2006 | Shostak et al. |
| 7,212,121 B2 | * | 5/2007 | Hashimoto et al. ....... 340/572.1 |
| 2003/0137415 A1 | | 7/2003 | Thomson |
| 2003/0222777 A1 | | 12/2003 | Sweatt |
| 2003/0234730 A1 | | 12/2003 | Arms et al. |

(Continued)

FOREIGN PATENT DOCUMENTS

EP    0942274 A2    9/1999

(Continued)

*Primary Examiner*—Tai T Nguyen
(74) *Attorney, Agent, or Firm*—William Schiesser; Hoffman Warnick LLC (57) ABSTRACT

The present invention provides a smart RFID infrastructure and method. Specifically, under the present invention, the infrastructure includes a set (e.g., one or more) of smart RFID tags adapted to communicate with one another, wherein each operating smart RFID tag is adapted to create an individual table of information pertaining to operation of other smart RFID tags. In addition, the infrastructure includes a set of writeable RFID tags adapted to communicate with and receive the individual table of information from each operating smart RFID tag, wherein each of the set of writeable RFID tags is further adapted to create a master table of information based on the individual table of information received from each operating smart RFID tag.

21 Claims, 10 Drawing Sheets

U.S. PATENT DOCUMENTS

| | | |
|---|---|---|
| 2004/0021582 A1 | 2/2004 | Ohdachi et al. |
| 2004/0030507 A1 | 2/2004 | Jung |
| 2005/0012613 A1 | 1/2005 | Eckstein et al. |
| 2005/0087235 A1 | 4/2005 | Skorpik et al. |
| 2005/0088299 A1 | 4/2005 | Bandy et al. |
| 2005/0162270 A1* | 7/2005 | Lambright et al. ....... 340/539.1 |
| 2005/0198228 A1 | 9/2005 | Bajwa et al. |
| 2005/0212661 A1 | 9/2005 | Friedrich |
| 2006/0025897 A1 | 2/2006 | Shostak et al. |
| 2006/0080819 A1 | 4/2006 | McAllister |
| 2006/0181414 A1 | 8/2006 | Bandy et al. |

FOREIGN PATENT DOCUMENTS

| | | |
|---|---|---|
| FR | 2721129 A1 | 12/1995 |

* cited by examiner

SMART RADIO-FREQUENCY IDENTIFICATION (RFID) INFRASTRUCTURE AND METHOD

CROSS-REFERENCE TO RELATED APPLICATIONS

This Application is related in some aspects to commonly assigned U.S. patent application Ser. No. 10/856,684, entitled "Wireless Sensor Network," filed May 28, 2004 and hereby incorporated by reference. This Application is also related in some aspects to commonly assigned U.S. patent application Ser. No. 10/946,714, entitled "Method, System and Program Product for Copying Data Between Nodes of a Wireless Sensor Network," filed Sep. 22, 2004 and also incorporated by reference.

FIELD OF THE INVENTION

In general the present invention relates to RFID technology. Specifically, the present invention relates to a smart RFID infrastructure and method.

BACKGROUND OF THE INVENTION

As Radio-Frequency Identification (RFID) technology has become more pervasive, the reliance on RFID technology has grown. Today every thing from security passes in electronically controlled doors to inventory management of products can be controlled via RFID technology. Current RFID technology comes in two forms, one utilizes "active" technology and the other "passive" technology. In the active RFID system, a beacon/radio signal is transmitted periodically with a built-in battery. In the passive system, the power source must be induced with a reader signal to transmit RFID tag data to a reader. Both forms utilize wireless technology that transmits data to a reader (portable or stationary). Unfortunately, current passive RFID systems do not communicate with each other. Instead, they rely on an external source to initiate a RF inductive coupling energy into a small capacitor on the passive tag that transmits back a preprogrammed binary code that is unique for every passive and active tag.

Therefore, relying on an external reader does not provide a highly effective percent read, especially when these tags are placed among products such as palettes of liquid (i.e., due to RF absorption). That is, limited read ranges and interference with radio signals caused by metals and liquids have presented barriers to accurately read all RFID tags.

In view of the foregoing, there exists a need for a solution that solves at least one of the problems in the related art.

SUMMARY OF THE INVENTION

In general, the present invention provides a smart Radio-Frequency Identification (RFID) infrastructure and method. Specifically, under the present invention, the infrastructure includes a set of smart RFID tags adapted to communicate with one another, wherein each operating smart RFID tag is adapted to create an individual table of information pertaining to operation of other smart RFID tags. In addition, the infrastructure includes a set of writeable RFID tags adapted to communicate with and receive the individual table of information from each operating smart RFID tag, wherein each of the set of writeable RFID tags is further adapted to create a master table of information based on the individual table of information received from each operating smart RFID tag.

In another embodiment, a RFID infrastructure is provided that comprises: a set of RFID tags positioned about a set of adjacent objects; and a set of writeable RFID tags positioned in proximity to the set of RFID tags, wherein each of the set of writeable RFID tags are adapted to communicate with the set of RFID tags and create a master table of information pertaining to operation of the set of RFID tags.

According to a first aspect of the present invention, a smart Radio-Frequency Identification (RFID) infrastructure is provided that comprises: a set of smart RFID tags adapted to communicate with one another, wherein each operating smart RFID tag is adapted to create an individual table of information pertaining to operation of other smart RFID tags; and a set of writeable RFID tags adapted to communicate with and receive the individual table of information from each operating smart RFID tag, wherein each of the set of writeable RFID tags is further adapted to create a master table of information based on the individual table of information received from each operating smart RFID tag.

According to a second aspect of the present invention, a smart Radio-Frequency Identification (RFID) method is provided that comprises: providing a set of smart RFID tags adapted to communicate with one another, wherein each operating smart RFID tag is adapted to create an individual table of information pertaining to operation of other smart RFID tags; and providing a set of writeable RFID tags adapted to communicate with and receive the individual table of information from each operating smart RFID tag, wherein each of the set of writeable RFID tags is further adapted to create a master table of information based on the individual table of information received from each operating smart RFID tag.

According to a third aspect of the present invention, a smart Radio-Frequency Identification (RFID) method, comprising: a set of smart RFID tags positioned about a set of adjacent objects communicating with one another to determine a functionality of each of the set of RFID tags; each operating one of the set of RFID tags creating an individual table of information pertaining to the set of RFID tags; a writeable RFID tag communicating with the set of RFID tags and receiving the individual table of information from each of the operating one of the set of RFID tags; and the writeable RFID tag creating a master table of information based on the individual table of information received from each of the operating smart RFID tags.

According to a fourth aspect of the present invention, a Radio-Frequency Identification (RFID) infrastructure is provided that comprises: a set of RFID tags positioned about a set of adjacent objects; and a set of writeable RFID tags positioned in proximity to the set of RFID tags, wherein each of the set of writeable RFID tags are adapted to communicate with the set of RFID tags and create a master table of information pertaining to operation of the set of RFID tags.

According to a fifth aspect of the present invention, a Radio-Frequency Identification (RFID) method is provided that comprises: positioning a set of RFID tags about a set of adjacent objects; and strategically positioning a set of writeable RFID tags in proximity to the set of RFID tags; and each of the set of writeable RFID tags communicating with the set of RFID tags and creating a master table of information pertaining to operation of the set of RFID tags.

According to a sixth aspect of the present invention, a method for deploying a smart Radio-Frequency Identification (RFID) infrastructure is provided that comprises: providing a set of smart RFID tags adapted to communicate with one another, wherein each operating smart RFID tag is adapted to create an individual table of information pertaining to operation of other smart RFID tags; and providing a set of writeable RFID tags adapted to communicate with and receive the individual table of information from each operating smart RFID tag, wherein each of the set of writeable RFID tags is further adapted to create a master table of information based on the individual table of information received from each operating smart RFID tag.

According to a seventh aspect of the present invention, a method for deploying smart Radio-Frequency Identification (RFID) infrastructure is provided that comprises: positioning a set of RFID tags about a set of adjacent objects; and strategically positioning a set of writeable RFID tags in proximity to the set of RFID tags; and each of the set of writeable RFID tags communicating with the set of RFID tags and creating a master table of information pertaining to operation of the set of RFID tags.

Therefore, the present invention provides RFID infrastructures and methods.

BRIEF DESCRIPTION OF THE DRAWINGS

These and other features of this invention will be more readily understood from the following detailed description of the various aspects of the invention taken in conjunction with the accompanying drawings in which:

FIG. 10 depicts a second diagram of the RFID infrastructure of FIG. 9. The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention includes the following headings.
I. General Description
II. Specific Implementations
A. Smart RFID tags
B. RFID tags I. General Description As indicated above, the present invention provides a smart RFID infrastructure and method. Specifically, under the present invention, the infrastructure includes a set (i.e., one or more) of smart RFID tags adapted to communicate with one another, wherein each operating smart RFID tag is adapted to create an individual table of information pertaining to operation of other smart RFID tags. In addition, the infrastructure includes a set of writeable RFID tags adapted to communicate with and receive the individual table of information from each operating smart RFID tag, wherein each of the set of writeable RFID tags is further adapted to create a master table of information based on the individual table of information received from each operating smart RFID tag.

In another embodiment, a RFID infrastructure is provided that comprises: a set of RFID tags positioned about a set of adjacent objects; and a set of writeable RFID tags positioned in proximity to the set of RFID tags, wherein each of the set of writeable RFID tags are adapted to communicate with the set of RFID tags and create a master table of information pertaining to operation of the set of RFID tags.

Figure 1:
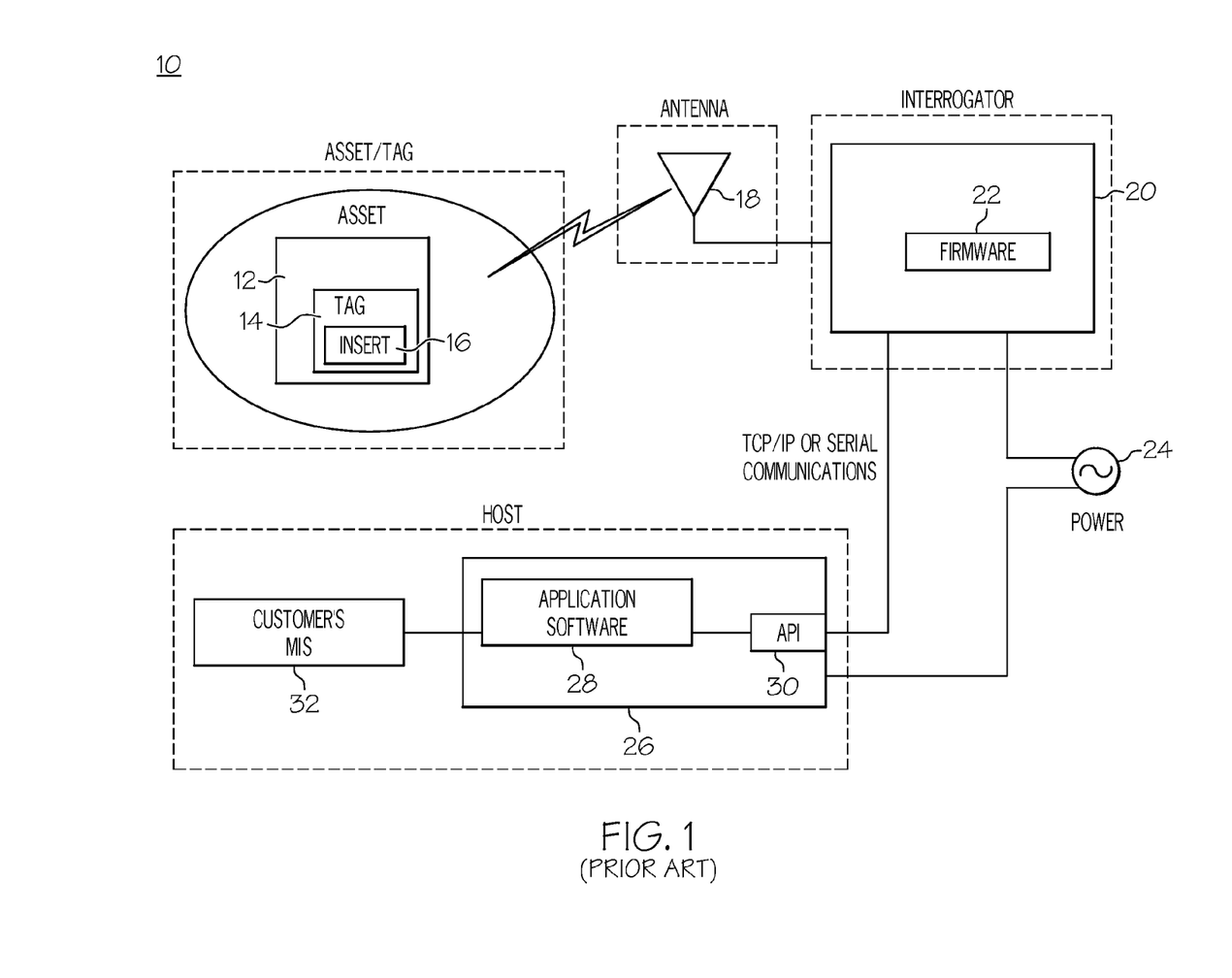
FIG. 1 depicts RFID system components according to the related art.

Referring now to FIG. 1, a typical arrangement 10 of RFID components is shown. As depicted, an RFID tag 14 having an insert such as an RFID chip 16 can be positioned on an asset 12 (e.g., a product). RFID tag 14 can communicate via an antenna 18 with an interrogator or RFID reader 20 that is equipped with firmware (software) 22 and is connected to power supply 24. RFID Reader 20 will communicate with a host/server 26 via an application programming interface (API) 30. Application software 28 loaded on server 26 allows a management information system (MIS) 32 to access server 26 and application software 28.

Figure 2:
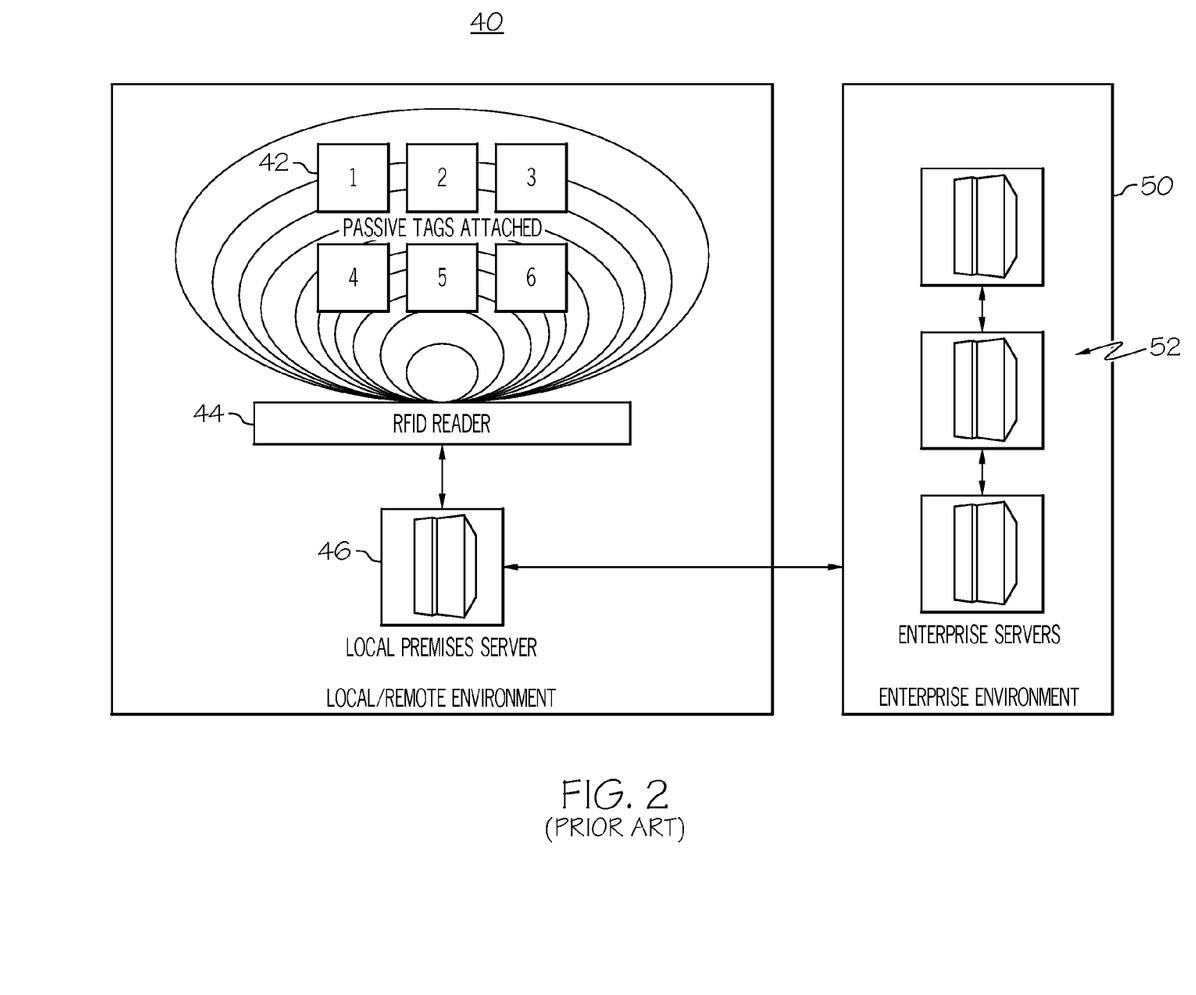
FIG. 2 depicts a diagram of an RFID infrastructure according to the related art.

Referring now to FIG. 2, an RFID infrastructure 40 according to the related art is shown. As depicted, objects 42 are fitted with passive RFID tags. In this illustrative embodiment, objects 42 are containers of liquid packaged adjacent to one another on a palette or the like. In any event, RFID reader 44 will attempt to detect the RFID tags and communicate the results to server 46, which itself can communicate with enterprises servers 52 or enterprise environment 50.

Figure 3:
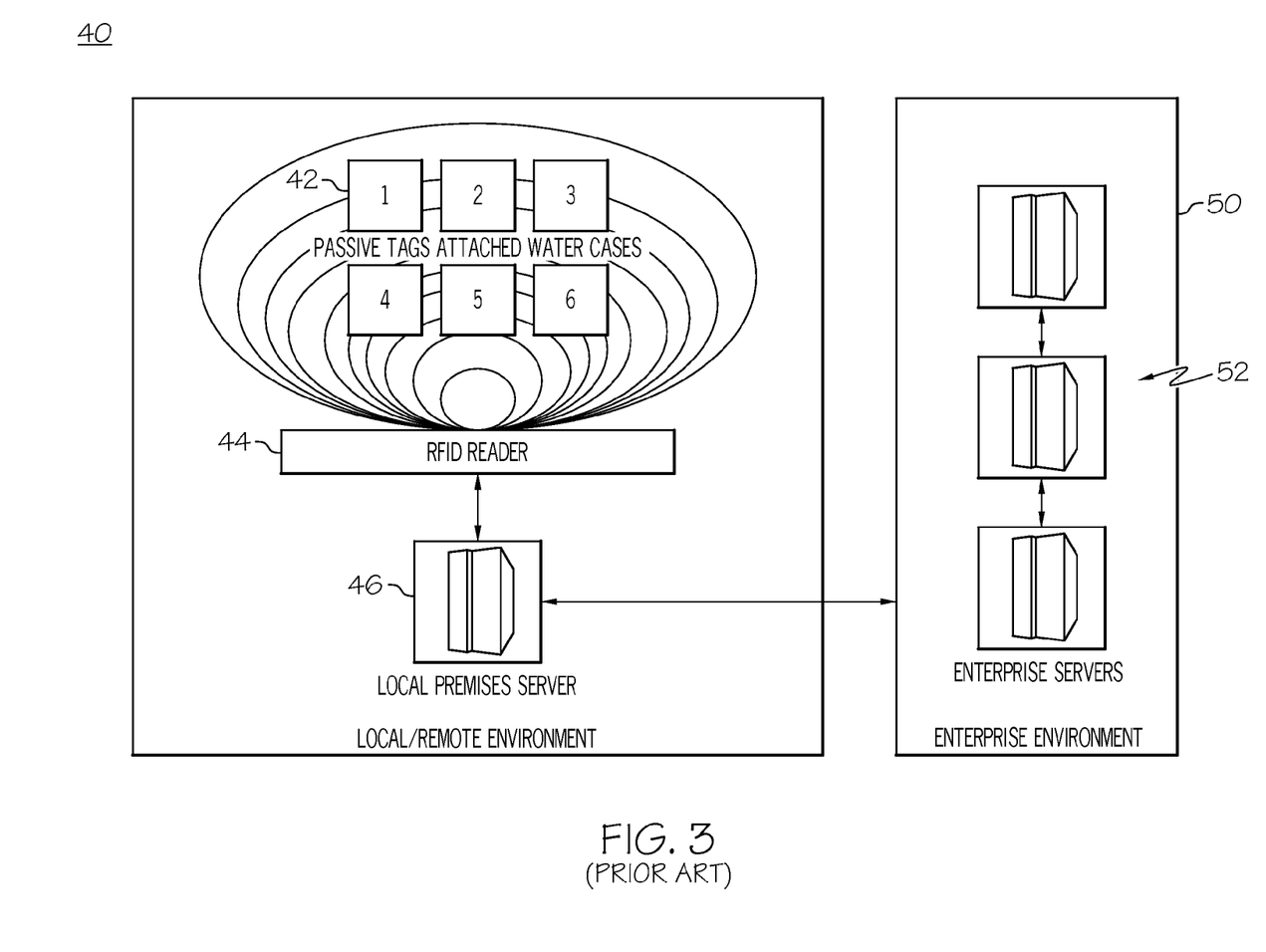
FIG. 3 depicts the RFID infrastructure of FIG. 2 during a failure scenario according to the related art.

A problem with infrastructure 40 is shown in FIG. 3, where the RFID tags attached to items 1 and 4 cannot be detected by RFID reader 44 even though they may be functional. This could be caused for a variety of reasons. One such reason is the absorption of the RF signal from the RFID tags caused by the liquid in the objects/containers 42. When this occurs, it appears to RFID reader as if objects 1 and 4 did not even exist in the environment. As such, server 44 will only report to enterprise 50 that objects 2, 3, 5, and 6 have been detected, while objects 1 and 4 are never reported.

II. Specific Implementations
    A. Smart RFID Tags

The present invention addresses issues such as this with a smart RFID infrastructure (hereinafter infrastructure 60) such as that shown in FIG. 4. Specifically, under infrastructure 60, smart, passive RFID tags (hereinafter tags 64) are attached/positioned on objects 62. In general, tags 64 integrate a passive RFID tag with smart technology with the capability to discover neighboring tags 64 and keep a local/individual table of information pertaining to operation of the other RFID tags 64. Each operational/functioning RFID tag 64 ensures that it has recorded all neighboring tags 64 by crosschecking the individual tables of information maintained by other tags 64. In general, tags 64 are first activated using a low RF frequency transmitted by RFID reader 66. Thereafter, a standard high RF frequency is used for communication among RFID tags 64. It should be appreciated that although six objects 62 and tags 64 are depicted, this for illustrative purposes only and that the teachings recited herein could be carried out with any quantity of objects 62 and/or tags 64.

Figure 4:
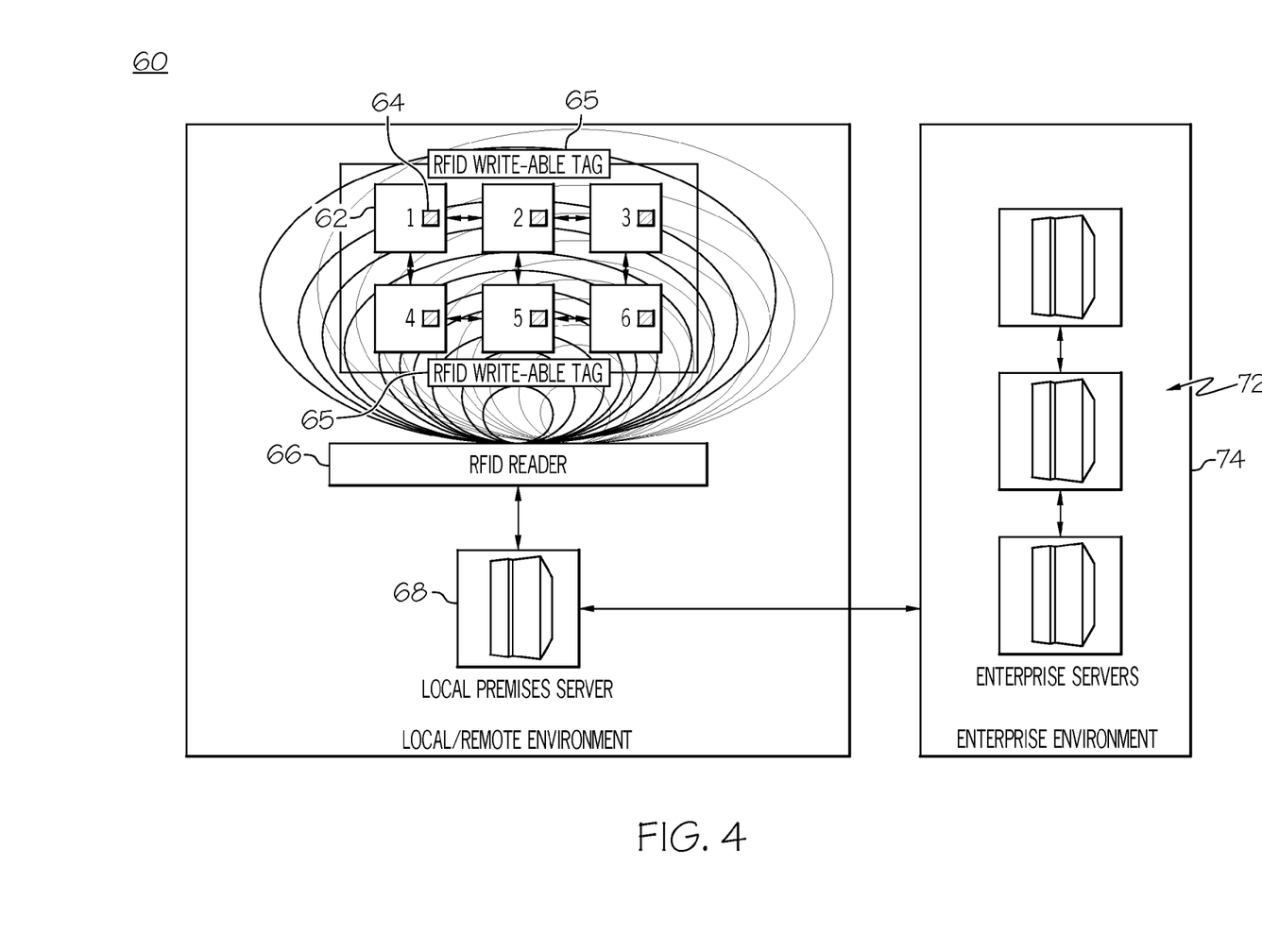
FIG. 4 depicts a first diagram of a smart RFID infrastructure according to the present invention.

In any event, also shown in FIG. 4 is a set (e.g., one or more) of writeable (master smart) RFID tags 65 that are positioned about objects 62 and RFID tags 64 (two are shown for illustrative purposes). Each writeable RFID tag 65 is adapted to communicate with and receive the individual table of information from each operating/functioning RFID tag 64. Each writeable RFID tag 65, is further adapted to create a master table of information based on the individual table(s) of information received from each operating RFID tag 64.

It should be understood that RFID tags 64 and writeable RFID tags 65 have a "pre-active algorithm" built in to perform the discovery and recording of its neighbors and other RFID tags 64 around the environment (e.g., using the concepts described in the above-incorporated patent applications). Since a lower RF frequency is used to power these RFID tags 64 and writeable RFID tags 65, the power will enable them to have a microprocessor that has a memory ROM capable of storing information. The power will be sufficient to power a low power arm processor type or any other low power processors. Writeable RFID tags 65 comprise at least twice the size of the current RFID memory ROMs, which have the capability to receive data. Each writeable RFID tag 65 has built in reader capabilities that are enabled using a small microprocessor and memory ROM to inquire and obtain information of the RFID tags 64 that are on or around objects 62. In a typical embodiment, objects 62 are products such as containers of liquid packaged on a pallet or the like. As such, writeable RFID tags 65 could be mounted on the pallet, or after the items on the pallet are packaged/shrink wrapped, on the side thereof. In order to supply power to the writeable RFID tags 65 and the RFID tags 64, lower RF signal will be propagated in the same environment to initiate power on these devices. Since the power is provided from the lower frequency, each microprocessor has the ability to perform recording to the memory ROM of the various smart RFID tags 64 and 65 that are in the environment. The present invention can also integrate existing passive RFID tags 64 with active writeable tags 65 so that writeable RFID tags 65 can record all RFID tags 64 that it has scanned in the environment. In return, writeable RFID tags 65 tags will then interface with the RFID reader 66 and return the total number of RFID tags 64 it has read.

Each writeable RFID tag 65 typically has a microprocessor that will write to a local memory ROM of the various RFID tags 64 that it has found either by itself, or by comparing the individual tables of information of the various neighboring RFID tags 64. Each writeable RFID tag 65 can communicate via RF (e.g., either 900 Mhz or radio bands that are in the ISM standard) with RFID tags 64 via RF signals, and can share a common communication protocol that is universally understood. In addition, each writeable RFID tag 65 could have a time period to query the various RFID tags 64 that are placed on objects 62 and obtain/match the individual tables of information to ensure that all information is similar.

Figure 5:
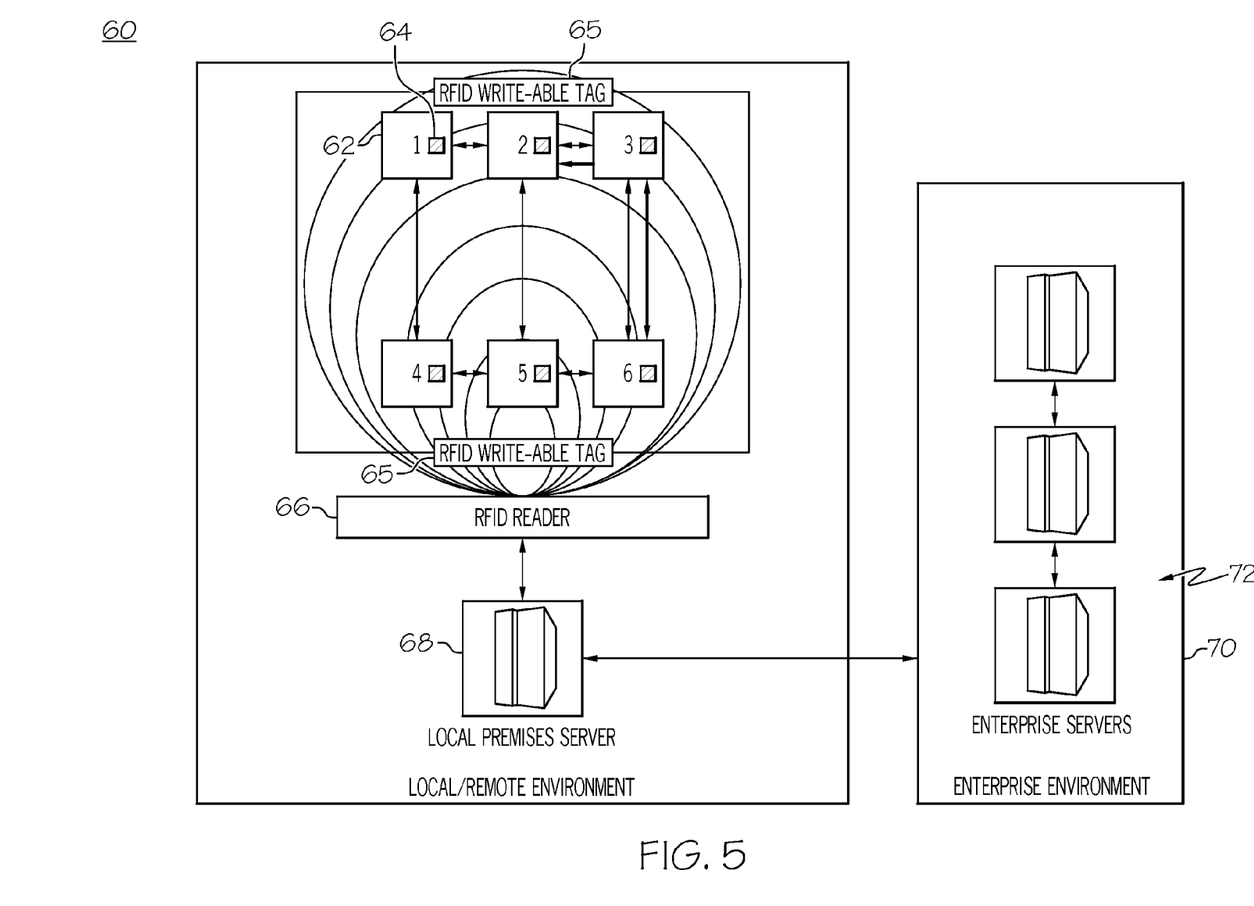
FIG. 5 depicts a second diagram of the smart RFID infrastructure of FIG. 4.

Referring now to FIG. 5, these concepts are shown in greater detail in an illustrative example. In this example, RFID tags 64 will be specifically referred to by the reference numerals shown on objects 62 (e.g., 1-6). In step 1 of the example, smart RFID tag 3 discovers neighboring tags 2 and 6 and updates its individual table of information by recording their identifications and other operation information. Smart RFID tags 2 and 6 also update their own individual tables of information to include smart RFID tag 3.

Shown below is an illustrative table of information for smart RFID tag 3: Table of information for smart RFID tag 3:

| Smart RFID | ID | Information |
|---|---|---|
| SRFID 3 | 00:00:00:01 | Water Case |
| SRFID 2 | 00:00:00:14 | Water Case |
| SRFID 6 | 0A:13:00:42 | Water Case |

Shown below are illustrative tables of information for smart RFID tag 2 before and after communication with smart RFID tag 3:

Table of information for smart RFID tag 2 (before communication with smart tag RFID 3):

| Smart RFID | ID | Information |
|---|---|---|
| SRFID 2 | 00:00:00:14 | Water Case |

Table of information for smart tag RFID 2 (after communication with smart tag RFID 3):

| Smart RFID | ID | Information |
|---|---|---|
| SRFID 2 | 00:00:00:14 | Water Case |
| SRFID 3 | 00:00:00:01 | Water Case |
| SRFID 6 | 0A:13:00:42 | Water Case |

As can be seen, after communicating with smart RFID tag 3, the table of information for smart RFID tag 2 has been updated based on the information contained in the table for smart RFID tag 3.

Figure 6:
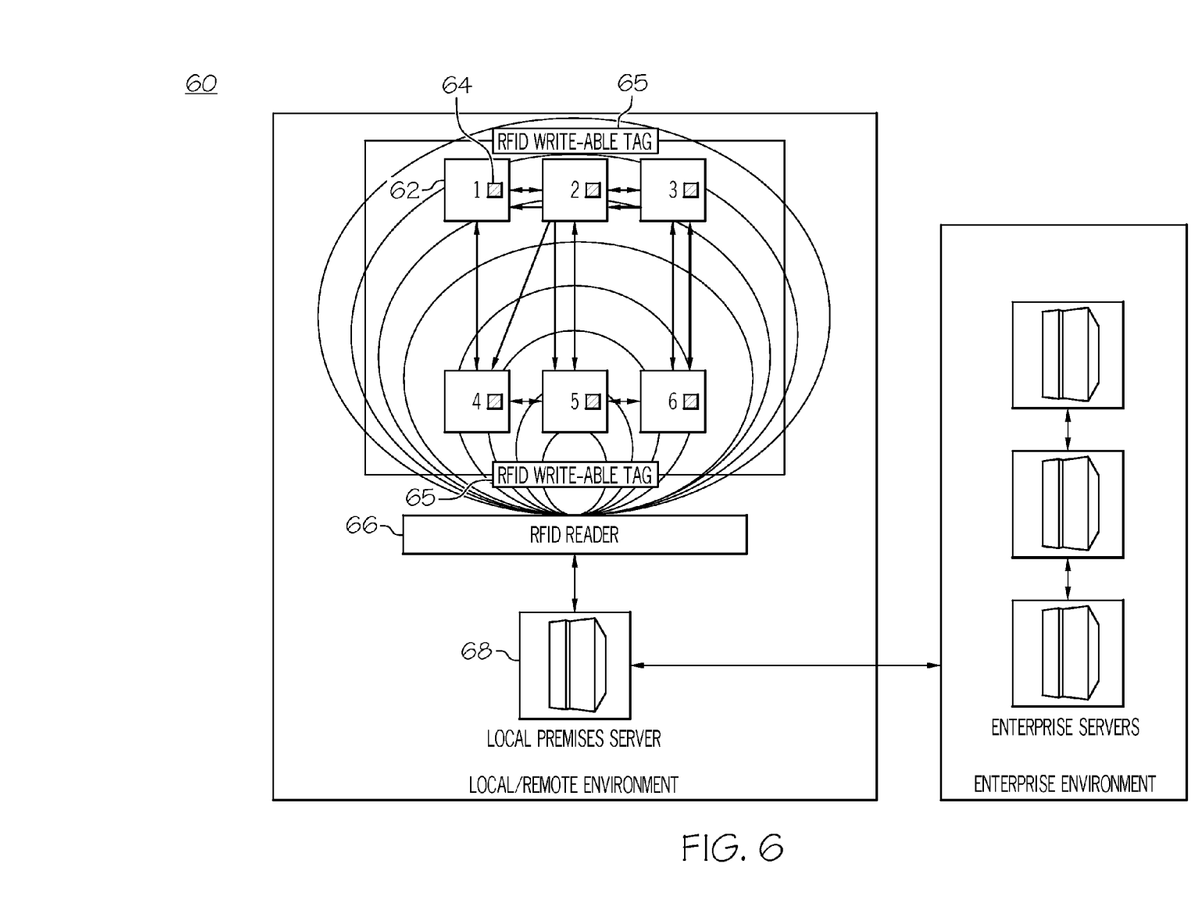
FIG. 6 depicts a third diagram of the smart RFID infrastructure of FIG. 4.

Referring now to FIG. 6, the example is continued. In step 2, smart RFID tag 2 (or any other smart RFID tag: no particular order) discovers smart RFID tags 1, 4, and 5. It updates its table of information recording their identifications and other operation information in its own local database. Smart RFID tags 1, 4, and 5 also update their tables of information to include smart RFID tag 2.

Shown below is an illustrative table of information for smart RFID tag 2:

| Smart RFID | ID | Information |
|---|---|---|
| SRFID 3 | 00:00:00:01 | Water Case |
| SRFID 2 | 00:00:00:14 | Water Case |
| SRFID 6 | 0A:13:00:42 | Water Case |
| SRFID 1 | 0C:10:00:02 | Water Case |
| SRFID 4 | 00:15:00:13 | Water Case |
| SRFID 5 | 01:00:00:32 | Water Case |

Shown below are illustrative tables of information for smart RFID tag 4 before and after communication with smart RFID tag 2:

Table of information for smart RFID tag 4 (before communication with smart RFID tag 2):

| Smart RFID | ID | Information |
|---|---|---|
| SRFID 4 | 00:15:00:13 | Water Case |

Table of information for smart RFID tag 4 (after communication with smart RFID tag 2):

| Smart RFID | ID | Information |
|---|---|---|
| SRFID 4 | 00:15:00:13 | Water Case |
| SRFID 3 | 00:00:00:01 | Water Case |
| SRFID 2 | 00:00:00:14 | Water Case |
| SRFID 6 | 0A:13:00:42 | Water Case |
| SRFID 1 | 0C:10:00:02 | Water Case |
| SRFID 5 | 01:00:00:32 | Water Case |

As can be seen, after communicating with smart RFID tag 2, the table of information for smart RFID tag 4 has been updated based on the information contained in the table for smart RFID tag 2.

Figure 7:
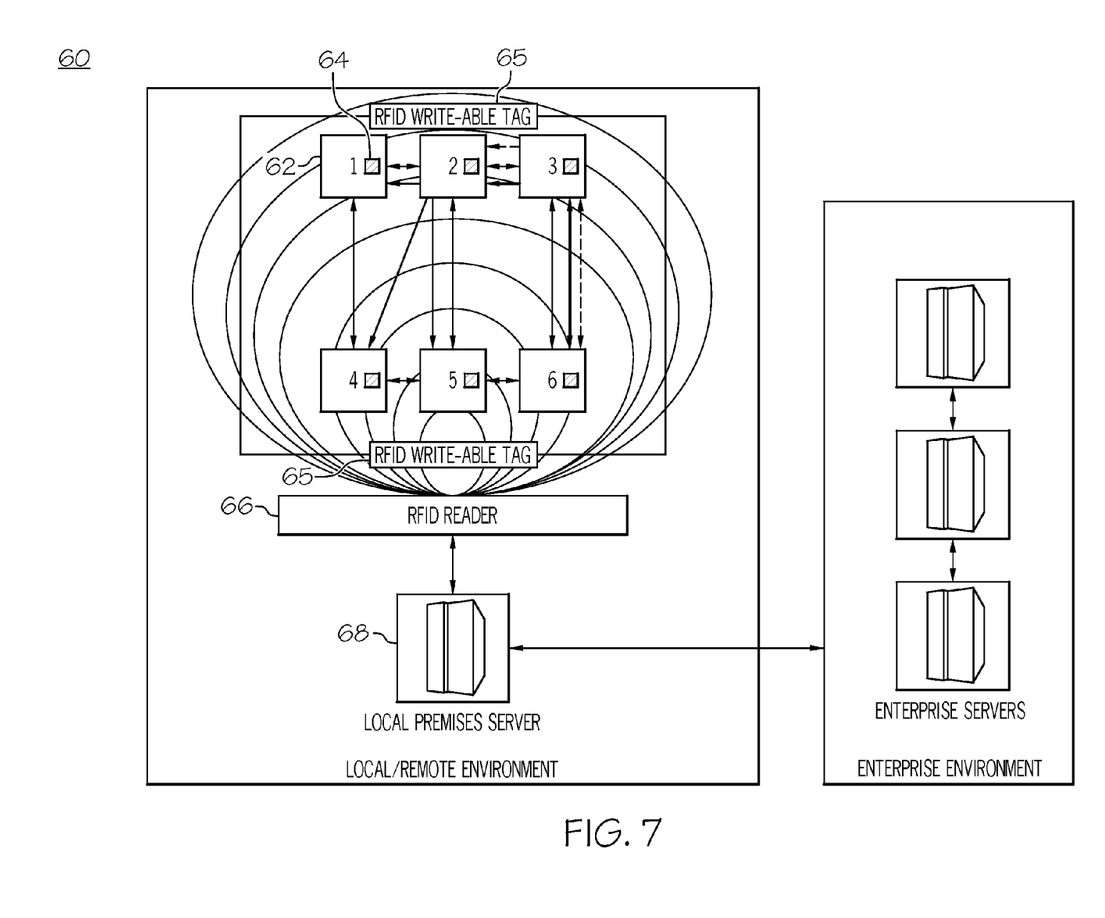
FIG. 7 depicts a fourth diagram of the smart RFID infrastructure of FIG. 4.

The example is continued in FIG. 7. Specifically, in step 3, each smart RFID tag 1-6 will periodically query its neighbors and cross check on their tables of information to make sure that they themselves locally have all the smart RFID tags in the environment noted in their table. Specifically for smart RFID tag 3, based on step 1, it currently has the following information in the database:

Table of information for Smart RFID 3:

| Smart RFID | ID | Information |
|---|---|---|
| SRFID 3 | 00:00:00:01 | Water Case |
| SRFID 2 | 00:00:00:14 | Water Case |
| SRFID 6 | 0A:13:00:42 | Water Case |

After querying smart RFID tag 2 again on its next inquiry, it notes that there is a variation in data and starts updating its own table of information with the missing values:

Table of information for Smart RFID 3 after querying SRFID 2:

| Smart RFID | ID | Information |
|---|---|---|
| SRFID 3 | 00:00:00:01 | Water Case |
| SRFID 2 | 00:00:00:14 | Water Case |
| SRFID 6 | 0A:13:00:42 | Water Case |
| SRFID 1 | 0C:10:00:02 | Water Case |
| SRFID 4 | 00:15:00:13 | Water Case |
| SRFID 5 | 01:00:00:32 | Water Case |

Similarly, smart RFID tag 6 and all other smart RFID tags will periodically query its neighbors and eventually update their tables and have the total number of smart RFID tags in the environment.

Figure 8:
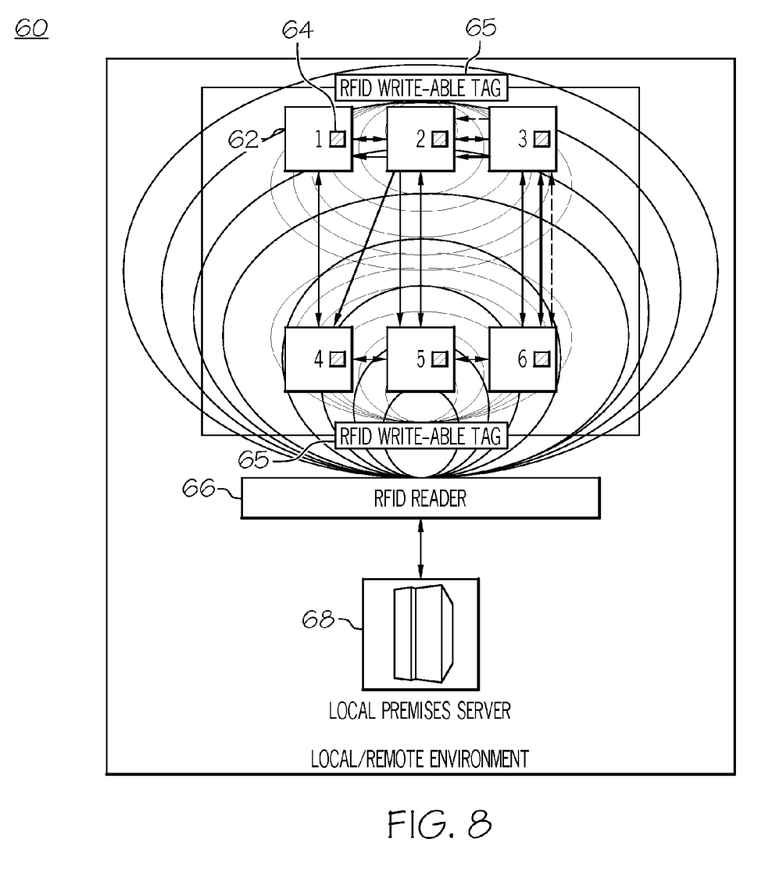
FIG. 8 depicts a fifth diagram of the smart RFID infrastructure of FIG. 4.

Referring now to FIG. 8, the process continues in step 4 in which each writeable RFID tag 65 will periodically query each smart RFID tag 64 in the environment and receive their individual tables of information. Each writeable RFID Tag 65 will then compose its own master table of information based on the various individual tables of information received from smart RFID tags 64.

For example, when a writeable RFID tag 65 inquires, it can receive the following (example smart RFID tags 3 & 4):

|  | ID | Information |
|---|---|---|
| Smart RFID 3 | | |
| SRFID 3 | 00:00:00:01 | Water Case |
| SRFID 2 | 00:00:00:14 | Water Case |
| SRFID 6 | 0A:13:00:42 | Water Case |
| Smart RFID 4 | | |
| SRFID 4 | 00:15:00:13 | Water Case |
| SRFID 3 | 00:00:00:01 | Water Case |
| SRFID 2 | 00:00:00:14 | Water Case |
| SRFID 6 | 0A:13:00:42 | Water Case |
| SRFID 1 | 0C:10:00:02 | Water Case |
| SRFID 5 | 01:00:00:32 | Water Case |

Based on the information above, it will verify and cross match the two (or more) databases and compose the final or master table of information database information of smart RFID tags as follows:

RFID Write-able Tag Final Database Table:

| Smart RFID | ID | Information |
|---|---|---|
| SRFID 4 | 00:15:00:13 | Water Case |
| SRFID 3 | 00:00:00:01 | Water Case |
| SRFID 2 | 00:00:00:14 | Water Case |
| SRFID 6 | 0A:13:00:42 | Water Case |
| SRFID 1 | 0C:10:00:02 | Water Case |
| SRFID 5 | 01:00:00:32 | Water Case |

This information will be transmitted to RFID reader 66 and then to local server 68, which can then communicate the same to one or more enterprise servers 72 within enterprise 70. IN the event that multiple master tables are received (i.e., there are multiple writeable RFID tags 65, RFID reader 66, local server 68 and/or enterprise servers 72 could be adapted to combine the multiple master tables into a single master table.

B. RFID Tags

Figure 9:
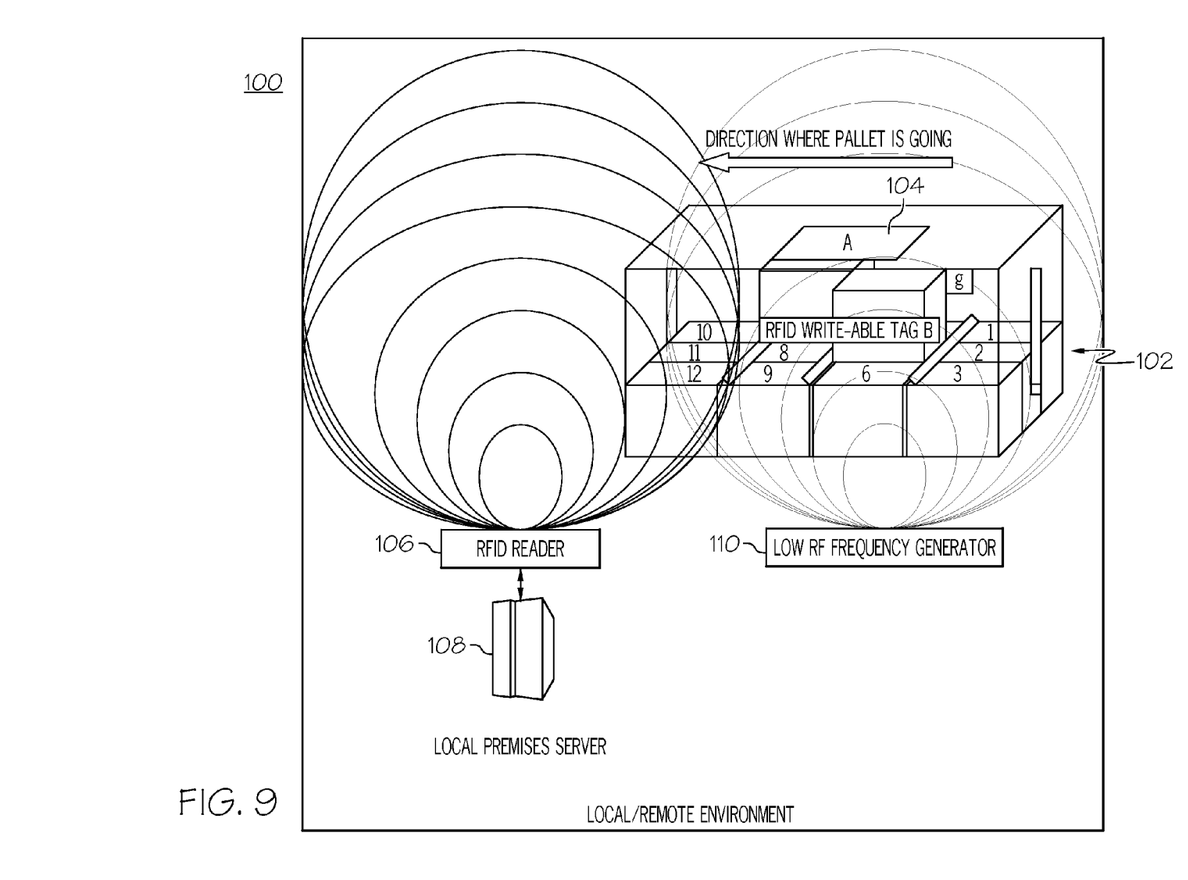
FIG. 9 depicts a first diagram of a RFID infrastructure according to another embodiment of the present invention.
Figure 10:
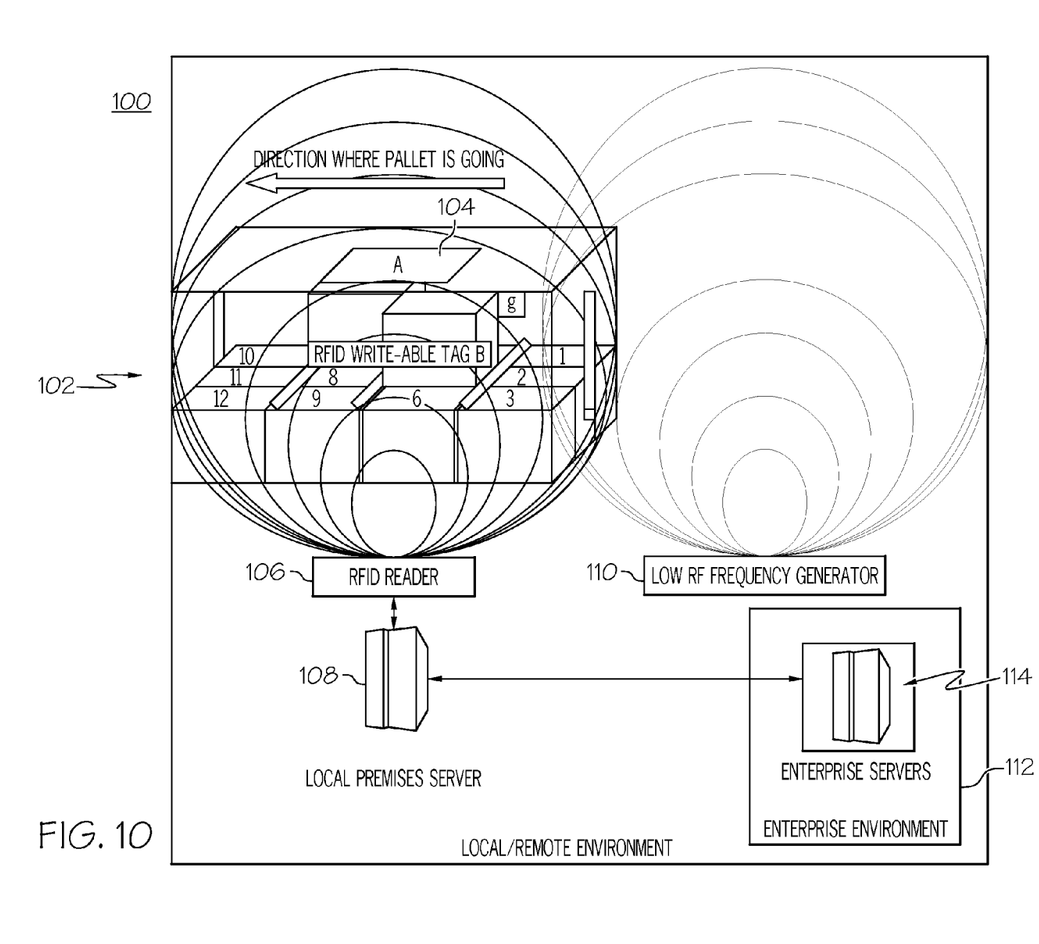

Referring now to FIG. 9, another embodiment of the present invention is depicted. Specifically, FIG. 9 depicts a RFID infrastructure 100 in which standard passive RFID tags (labeled 1-12) are attached to/positioned on objects 102 (e.g., liquid containers on a pallet). In addition, a set of smart, passive writeable RFID tags 104 (labeled A, B, C, etc.) are strategically positioned around the RFID tags 1-12. Specifically, writeable RFID tags 104 are positioned so as to be able to communicate with their assigned RFID tags 1-12. In this embodiment, RFID tags 1-12 are activated or powered using low RF frequency (e.g., transmitted by low RF frequency generator 110 or RFID reader 106). However, RFID tags 1-12 are not "smart" in that they do not communicate with one another or create individual tables of information. However, writeable RFID tags 104 will periodically query the RFID tags 1-12 in the same manner as described above to determine which RFID tags 1-12 are operational. Along these lines, writeable RFID tags 104 can similarly maintain master tables of information. This information will then be communicated to RFID reader 106 and then to server 108. As indicated above, when multiple master tables are present, they can be combined into a single master table. In any event, as show in FIG. 10, as the pallet of objects 102 moves, RFID reader 106 is capable of transmitting the low frequency RF signal to power RFID tags 1-2 and writeable RFID tags 104.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims. For example, it should be understood that either of the embodiments shown in FIG. 4-10 could incorporate any of the teachings of FIGS. 1-3.

We claim:

1. A smart Radio-Frequency Identification (RFID) infrastructure, comprising:
   a set of smart RFID tags adapted to communicate with one another, wherein each smart RFID tag that is operating is adapted to create and store an individual table of information pertaining to operation of other smart RFID tags, each operating smart RFID tag ensuring that its individual table of information contains information regarding all operating smart RFID tags in the set of smart RFID tags by periodically cross-checking its individual table of information against the individual tables of information of adjacent operating smart RFID tags in the set of smart RFID tags; and
   a set of writeable RFID tags adapted to communicate with and receive the individual table of information from each operating smart RFID tag, wherein each of the set of writeable RFID tags is further adapted to create a master table of information based on the individual table of information received from each operating smart RFID tag.

2. The smart RFID infrastructure of claim 1, wherein the set of smart RFID tags and the set of writeable RFID tags are passive RFID tags.

3. The smart RFID infrastructure of claim 1, further comprising:
   a RFID reader adapted to communicate with and receive the master table of information from each of the set of writeable RFID tags; and
   a server adapted to communicate with and receive the master table of information from the RFID reader.

4. The smart RFID infrastructure of claim 3, wherein the set of smart RFID tags are activated with a low RF frequency and communicate with one another using a high RF frequency.

5. The smart RFID infrastructure of claim 1, wherein the set of smart RFID tags comprises a plurality of smart RFID tags positioned on a plurality of adjacent objects.

6. The smart RFID infrastructure of claim 1, wherein each of the set of smart RFID tags are adapted to communicate with adjacent smart RFID tags.

7. A smart Radio-Frequency Identification (RFID) method, comprising:
   providing a set of smart RFID tags adapted to communicate with one another, wherein each smart RFID tag that is operating is adapted to create and store an individual table of information pertaining to operation of other smart RFID tags, each operating smart RFID tag ensuring that its individual table of information contains information regarding all operating smart RFID tags in the set of smart RFID tags by periodically cross-checking its individual table of information against the individual tables of information of adjacent operating smart RFID tags in the set of smart RFID tags; and
   providing a set of writeable RFID tags adapted to communicate with and receive the individual table of information from each operating smart RFID tag, wherein each of the set of writeable RFID tags is further adapted to create a master table of information based on the individual table of information received from each operating smart RFID tag.

8. The smart RFID method of claim 7, wherein the set of smart RFID tags and the set of writeable RFID tags are passive RFID tags.

9. The smart RFID method of claim 7, further comprising:
   providing a RFID reader adapted to communicate with and receive the master table of information from each of the set of writeable RFID tags; and
   providing a server adapted to communicate with and receive the master table of information from the RFID reader.

10. The smart RFID method of claim 9, further comprising activating the set of smart RFID tags with a low RF frequency.

11. The smart RFID method of claim 7, wherein the providing the set of smart RFID tags comprises positioning a plurality of smart RFID tags on a plurality of adjacent objects.

12. The smart RFID method of claim 7, wherein each of the set of smart RFID tags are adapted to communicate with adjacent smart RFID tags.

13. A smart Radio-Frequency Identification (RFID) method, comprising:
   a set of smart RFID tags, positioned about a set of adjacent objects, communicating with one another to determine a functionality of each of the set of smart RFID tags;
   each smart RFID tag that is operating in the set of smart RFID tags creating and storing an individual table of information pertaining to the set of smart RFID tags, each operating smart RFID tag ensuring that its table of information contains information regarding all operating smart RFID tags in the set of smart RFID tags by periodically cross-checking its individual table of information against the individual tables of information of adjacent operating smart RFID tags in the set of smart RFID tags;
   a writeable RFID tag communicating with the set of smart RFID tags and receiving the individual table of information from each operating smart RFID tag in the set of smart RFID tags; and
   the writeable RFID tag creating a master table of information based on the individual table of information received from each of the operating smart RFID tags.

14. The smart RFID method of claim 13, further comprising:
   a RFID reader receiving the master table of information from the writeable RFID tag; and
   a server receiving the master table of information from the RFID reader.

15. The smart RFID method of claim 13, further comprising activating the set of smart RFID tags with a low RF frequency.

16. The smart RFID method of claim 13, wherein the set of smart RFID tags comprises a plurality of smart RFID tags, and wherein the set of adjacent objects comprises a plurality of adjacent objects.

17. The smart RFID method of claim 13, wherein each of the set of smart RFID tags communicates with adjacent smart RFID tags.

18. A method for deploying a smart Radio-Frequency Identification (RFID) infrastructure, comprising:
   providing a set of smart RFID tags adapted to communicate with one another, wherein each smart RFID tag that is operating is adapted to create and store an individual table of information pertaining to operation of other smart RFID tags, each operating smart RFID tag ensuring that its table of information contains information regarding all operating smart RFID tags in the set of smart RFID tags by periodically cross-checking its individual table of information against the individual tables of information of adjacent operating smart RFID tags in the set of smart RFID tags; and providing a set of writeable RFID tags adapted to communicate with and receive the individual table of information from each operating smart RFID tag, wherein each of the set of writeable RFID tags is further adapted to create a master table of information based on the individual table of information received from each operating smart RFID tag.

19. The method of claim 18, wherein the set of smart RFID tags and the set of writeable RFID tags are passive RFID tags.

20. The method of claim 18, further comprising:

providing a RFID reader adapted to communicate with and receive the master table of information from each of the set of writeable RFID tags; and providing a server adapted to communicate with and receive the master table of information from the RFID reader.

21. The method of claim 20, further comprising activating the set of smart RFID tags with a low RF frequency.

\* \* \* \* \*